US010269100B1

(12) United States Patent
Kopysov

(10) Patent No.: US 10,269,100 B1
(45) Date of Patent: Apr. 23, 2019

(54) ACCELERATED SKIN SMOOTHING EFFECT

(71) Applicant: Facebook, Inc., Menlo Park, CA (US)

(72) Inventor: Andrei Igorevich Kopysov, Minsk (BY)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/041,629

(22) Filed: Jul. 20, 2018

Related U.S. Application Data

(63) Continuation of application No. 15/398,503, filed on Jan. 4, 2017, now Pat. No. 10,096,089.

(51) Int. Cl.
G06T 5/00 (2006.01)
H04N 1/62 (2006.01)
G06T 7/13 (2017.01)
G06T 5/50 (2006.01)

(52) U.S. Cl.
CPC ............... *G06T 5/002* (2013.01); *G06T 5/50* (2013.01); *G06T 7/13* (2017.01); *H04N 1/628* (2013.01); *G06T 2207/10024* (2013.01); *G06T 2207/20024* (2013.01); *G06T 2207/20221* (2013.01); *G06T 2207/30201* (2013.01)

(58) Field of Classification Search
CPC .. G06T 5/00; G06T 5/002; G06T 5/50; G06T 7/13; G06T 2207/10024; G06T 2207/20024; G06T 2207/20221; G06T 2207/30201; H04N 1/628
See application file for complete search history.

(56) References Cited

U.S. PATENT DOCUMENTS

| 9,105,088 | B1* | 8/2015 | Petrie | G06T 5/002 |
| 2003/0223622 | A1* | 12/2003 | Simon | G06K 9/00281 382/118 |
| 2004/0170337 | A1* | 9/2004 | Simon | G06K 9/00234 382/254 |
| 2008/0232692 | A1* | 9/2008 | Kaku | G06K 9/00362 382/190 |
| 2010/0309336 | A1* | 12/2010 | Brunner | G06T 5/008 348/234 |
| 2018/0253834 | A1* | 9/2018 | Pouli | G06T 5/007 |

* cited by examiner

Primary Examiner — Sean T Motsinger
(74) Attorney, Agent, or Firm — Baker Botts L.L.P.

(57) ABSTRACT

In one embodiment, a system may access an image of a face and generate blurred color information and blurred brightness information based on the image's color information. The system may detect edge information associated with the face based on the blurred brightness information. The edge information may identify regions in the image that correspond to edges of the face. The system may modify the blurred color information based on the edge information associated with the face. Edge color information may be determined based on the modified blurred color information and the image. The system may generate smoothed color information based on the color information of the image and modify the smoothed color information based on the edge color information. The system may generate an output of the face with smoothed skin using a portion of the color information of the image and a portion of the modified smoothed color information.

20 Claims, 13 Drawing Sheets
(6 of 13 Drawing Sheet(s) Filed in Color)

ACCELERATED SKIN SMOOTHING EFFECT

PRIORITY

This application is a continuation under 35 U.S.C. § 120 of U.S. patent application Ser. No. 15/398,503, filed 4 Jan. 2017.

TECHNICAL FIELD

This disclosure generally relates to digital image or video processing.

BACKGROUND

Image or video capturing devices are capable of recording fine details of real-life objects, along with their perceived imperfections. When the recorded object is a person or a person's face, perceived imperfections may include, for example, skin blemishes, wrinkles, discolorations, uneven surfaces, etc. Such perceived imperfections may be made less noticeable through image or video processing techniques. Conventional techniques, however, often require manual editing or suffer from performance limitations.

SUMMARY OF PARTICULAR EMBODIMENTS

The subject matter disclosed herein is directed to methods and systems for smoothing or softening skin appearance in videos or images in real-time. Advantageously, the disclosed methods/systems achieve skin smoothing without removing desirable image details, such as the edges/boundaries of a person's face, eyes, nose, lips, mouth, ears, hair, and/or other facial features. A further advantage of the disclosed skin-smoothing process is that it is optimized with less processing iterations and may be implemented on a computer's Graphical Processing Unit ("GPU") rather than on a Central Processing Unit ("CPU"), thus providing the desired performance enhancements to meet the requirements of real-time skin smoothing in live video.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

In particular embodiments, the skin-smoothing process described herein may be used to improve, in real-time, the skin appearance of a person appearing in a live video. For example, as a user is viewing his/her own live video through the use of a mobile device camera or webcam, the appearance of the user's skin in the live video may be smoothed in real-time and shared with others in real-time. In addition to live video, the skin-smoothing process described herein may be used to smooth skin appearances in stored videos and images. The embodiments described herein provide the advantage of smoothing skin appearance in images and videos without sacrificing image details in regions where smoothing is not desired (e.g., edges or boundaries of a person's face, eyes, mouth, etc.). Further, to meet the performance demands of real-time image/video processing, particular example embodiments provide an optimized process for smoothing skin using a computing device's GPU, rather than its CPU. While the examples provided below describe smoothing a person's skin depicted in an image, it should be appreciated that an image can represent, e.g., a frame in a video.

Conceptually, embodiments of the skin-smoothing process described herein may be categorized into three passes. In the first pass ("Pass 1"), an intermediate image may be generated by blurring the original image's information (e.g., steps 110, 120, and 130). In the second pass ("Pass 2"), edge/boundary information may be detected using the blurred intermediate image from Pass 1 (e.g., steps 140, 150, and 160). In the third pass ("Pass 3"), a filter image may be generated based on a smoothed original image using the results of Pass 2 (e.g., steps 170, 180, and 190). The filter image may then be output with the original image to provide the desired skin-smoothing effect.

Figure 1:
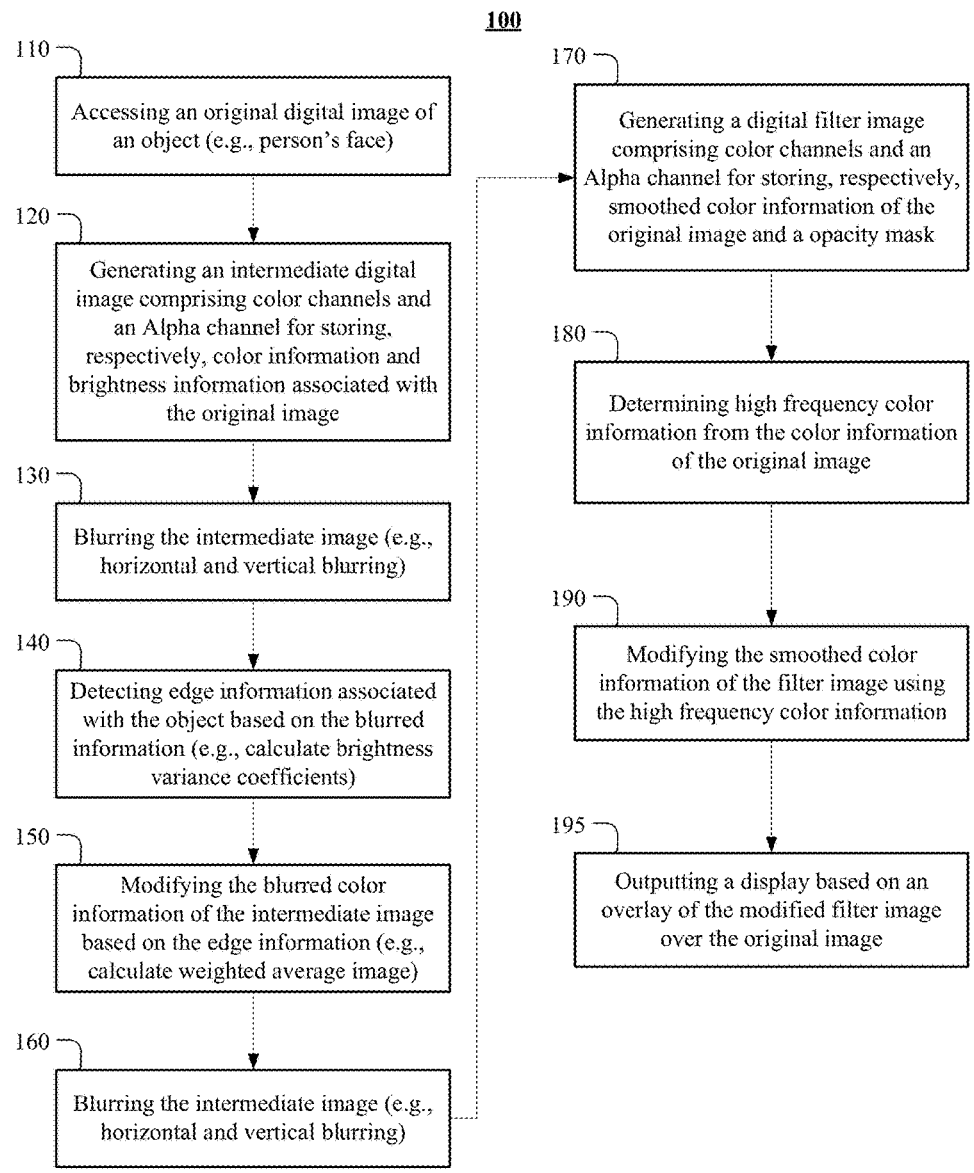
FIG. 1 illustrates an example embodiment of the skin-smoothing process described herein.
Figure 2A:
FIGS. 2A-I illustrate example images resulting from each processing phase of an embodiment of the skin-smoothing process described herein.

FIG. 1 illustrates an example flow chart of the skin-smoothing process described herein. Description of this example process will be made with references to FIGS. 2A-2I, which illustrate example images resulting from certain processing steps. In certain embodiments, a software implementation of a skin-smoothing process on a processing system (hereinafter referred to as "Skin Smoother") may take as input a digital image depicting an object, such as a head-shot or portrait view showing a person's face, to be processed (the image that is to be processed may hereinafter be referred to as an "original image"). For example, the skin-smoothing process 100 may begin at step 110, where the Skin Smoother may access (e.g., from memory, non-transitory storage, network, an image/video capturing device, or other data sources) an original digital image of an object. The object, for example, may be a person's face to be processed, such as the image shown in FIG. 2A. The original image may include color information, such red, green, and blue information (RGB), which is used by display devices to render the image. In certain embodiments, brightness information or luminance of the original image may be predetermined and accessed by the Skin Smoother. In certain embodiments, brightness information or luminance of the original image may be computed based on the color information.

In certain embodiments, the Skin Smoother may, at step 120, generate an intermediate digital image in preparation for subsequent steps of image processing. The intermediate digital image may include color channels. For example, a set of color channels may include three channels: one for red information, one for green information, and one for blue information (RGB). As another example, a set of color channels may include cyan, magenta, and yellow information (CMY). In certain embodiments, the intermediate digital image's color channels may contain color information corresponding to the color information of the original digital image (e.g., the color information of the original image may be copied into the intermediate image's color channels).

To facilitate identification of edges or boundaries of features of the object in the image where smoothing is less desired (e.g., person's face, eyes, lips, nostrils, ears, hair, eyebrows, etc.), in certain embodiments a gray-scale representation of the original image's brightness information may be stored with the intermediate digital image. In certain embodiments, the brightness information of the original image may be predetermined (e.g., stored in a non-color channel of the original image) or determined based on the available color information of the original image. In certain embodiments, the brightness information of the original image may be accentuated by squaring the information. Brightness information associated with the original image (e.g., the squared brightness information of the original image) may be stored separately or with the intermediate digital image. For example, the intermediate digital image may include a channel different from the color channels, such as an Alpha channel, which is conventionally used for storing opacity information. The brightness information associated with the original image may be stored, e.g., in the Alpha channel of the intermediate digital image. Storing brightness information in the Alpha channel of the intermediate image may provide processing and memory optimization because no additional memory needs to be allocated.

Figure 2B:
Figure 2C:

At step 130, the Skin Smoother in certain embodiments may blur the information comprised in each of the channels of the intermediate digital image. For example, the blurring process may be based on an average blurring technique, which for each target pixel to be blurred averages the color information of pixels within a predetermined kernel radius (or smoothness radius) centered at the target pixel. For example, a kernel radius of 8 pixels may cause the pixels within each 17-pixel-by-17-pixel square region in an image to be averaged. In certain embodiments, the blurring process at this stage may blur the image uniformly, ignoring edges or boundaries of depicted objects. Blurring may be applied to the color information stored in the color channels and the brightness information stored in the Alpha channel of the intermediate image. In certain embodiments where the Skin Smoother is implemented using a device's GPU, the blurring process may be separated into a horizontal blurring step (blurring based on neighboring pixels in the horizontal direction) and a vertical blurring step (blurring based on neighboring pixels in the vertical direction). FIGS. 2B and 2C are example images that illustrate, respectively, the intermediate image's blurred color information in the color channels and blurred brightness information in the Alpha channel, if these channels of the intermediate image are displayed after the blurring process at step 130. The blurring process, in effect, causes each blurred pixel's information to represent the mean or average information within the region, which provides computational and storage efficiencies and may be used in subsequent calculations as described below.

In certain embodiments, the blurred intermediate image may be used to detect edge/boundary information associated with the object in the image, such as facial regions where smoothing is not desired (e.g., eyes, mouth, facial edges, etc.). Such edge/boundary information may be used to identify facial details that should be retained in the final smoothed image. Conceptually, edge/boundary information may be detected based on, e.g., sudden changes in brightness or color between neighboring pixels. For example, the brightness/color of a pixel at the edge of a person's face may be drastically different from the background, and the brightness/color of a pixel at the edge of a person's lips may be drastically different from the person's skin surrounding the lips.

Figure 2D:

In certain embodiments, at step 140 the Skin Smoother may detect edge/boundary information associated with the object in the image based on the blurred brightness information and/or blurred color information of the intermediate digital image. In certain embodiments, brightness variance coefficients may be computed to statistically detect edge/boundary information. Brightness variance may be measured, e.g., by comparing the brightness value associated with the blurred color information and the blurred brightness information stored in the intermediate image. It should be appreciated that, because of the blurring (e.g., step 130), information (e.g., red color) associated with each pixel in the blurred intermediate digital image represents an average of the corresponding information of the neighboring pixels in the original image (e.g., brightness or color information of all pixels within the kernel centered at the pixel). Thus, each pixel information in the intermediate image takes into account neighboring pixel information in the original image. In certain embodiments, to compute a pixel's brightness information associated with its blurred color information (referred to as "meanI"), the following example equation may be used: $0.5*R+0.3*G+0.2*B$, where R represents red information, G represents green information, and B represents blue information. The square of this brightness information (i.e., meanI*meanI) may be compared to the pixel's Alpha channel information (referred to as "meanII"), which as previously discussed may store the blurred (or averaged) squared brightness information of the original image. The difference or variance (referred to as "varI") between the two (e.g., varI=absolute value of (meanII−meanI*meanI)) may represent a measure of brightness change within the region (kernel) centered at that pixel. The variance coefficient (referred to as "a") may be computed by dividing the variance by the sum of the variance plus a brightness variance range of, e.g., 0.0049 (e.g., a=varI/(varI+0.0049)). Thus, the variance coefficient may be a value between 0 and 1. The brightness variance coefficient would be closer to 1 if the variance (earI) is significantly larger than the brightness variance range (e.g., 0.0049), which indicates detection of a likely edge/boundary. Conversely, the brightness variance coefficient would be closer to 0 if the variance (earI) is significantly smaller than the brightness variance range (e.g., 0.0049), which indicates detection of an unlikely edge/ boundary (or internal non-edge/boundary region). In certain embodiments, each pixel may have an associated brightness variance coefficient. In certain embodiments, the brightness variance coefficient may be stored in the Alpha channel of an image. For example, the computed brightness variance coefficients may replace the blurred brightness information in the Alpha channel of the intermediate image. FIG. 2D, if displayed, provides an example of an image of brightness variance coefficients that has been blurred. As shown in FIG. 2D, regions with little variance may be represented by black/darkness (values close to 0) and regions with significant variance—which corresponds to edges/boundaries of the user's facial features—may be represented by white/brightness (values close to 1).

Figure 2E:
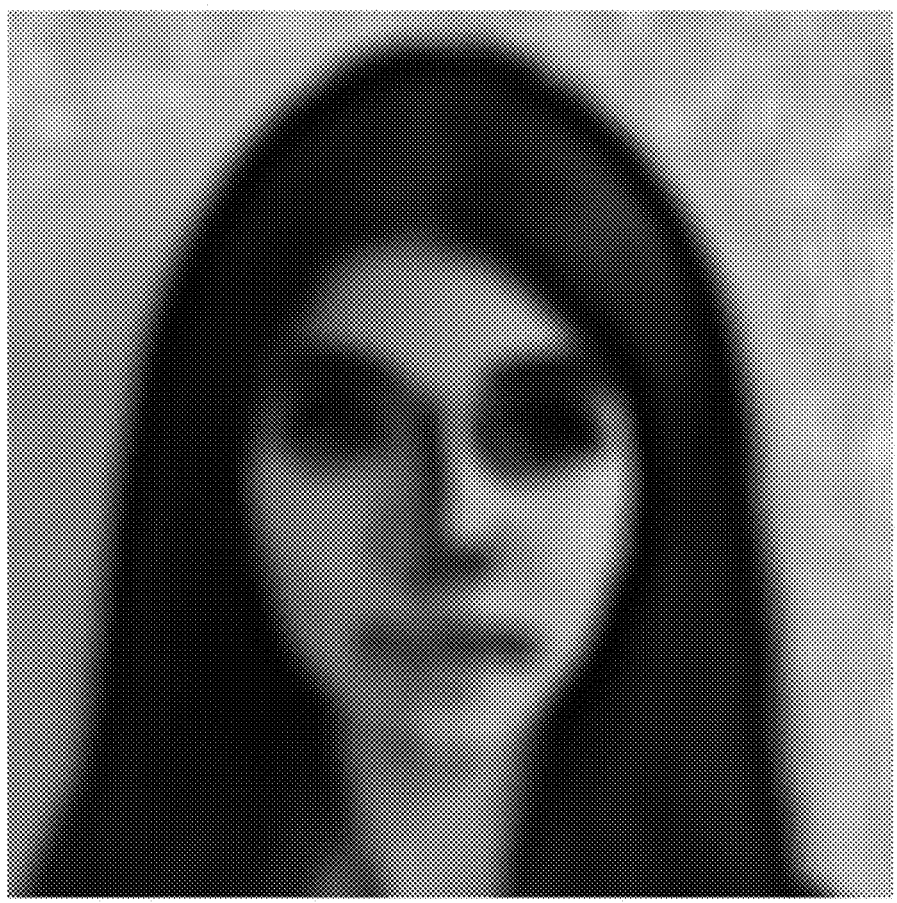

In certain embodiments, the blurred (or averaged) color information at each pixel of the intermediate image may be weighted differently based on the edge/boundary information (e.g., edge sharpness). For example, at step 150 the Skin Smoother may modify the blurred color information of the intermediate digital image based on the edge information associated with the object. For instance, the intermediate image's blurred color information (e.g., FIG. 2B), which was blurred without regard to edges/boundaries, may be modified based on the brightness variance coefficients (e.g., FIG. 2D). For instance, each pixel of the blurred/averaged color information of the intermediate image may be applied a weight using the corresponding brightness variance coefficient for that pixel. For example, the color of each pixel may be multiplied by (1.0-a), where a represents the brightness variance coefficient of that pixel. At edges/boundaries where the corresponding brightness variance coefficient is large, the value of a may be close to 1 (e.g., white edges in FIG. 2D). Consequently the applied weight (1.0-a) would be close to 0. Applying a small weight to the corresponding pixel's color information would cause the color value to be small and therefore darkened. Conversely, at non-edges/boundaries the corresponding brightness variance coefficient may be close to 0 (e.g., black regions in FIG. 2D). The applied weight (1.0-a) would therefore be closer to 1, which would result in the corresponding color information to be more significantly retained. The result of this process may be stored as another image or in the color channels of the intermediate image. FIG. 2E, if displayed, provides an example of the resulting weighted average color information that has been blurred. As shown in FIG. 2E, regions that corresponding to edges as identified by the brightness variance coefficients (e.g., the white borders in FIG. 2D) are represented in dark pixels.

In certain embodiments, an example programming code (using the OpenGL syntax) for computing brightness variance coefficients and weighted average image (e.g., Pass 2) is provided below:

```
const float brigtness_variance=0.07*0.07;
lowp vec4 calculateAB(medium vec2 uv) {//uv is a pixel coordinate
    lowp vec4 color=texture2D(Pass1, uv); //Pass1 is the intermediate image after step 130.
    medium float meanI=dot(color.rgb, vec3(0.5,0.3, 0.2));
    medium float meanII=color.a;
    medium float varI=abs(meanII−meanI*meanI);
    medium float a=varI/(varI+brightness variance);
    medium vec3 b=(1.0-a)*color.rgb;
    return vec4(b,a);
}
```

In certain embodiments, at step 160 the brightness variance coefficients stored in the Alpha channel and the weight average color information stored in the color channels may be blurred. The blurring process may be based on average blurring using a predetermined kernel size, which may be the same or different from the kernel size used in the blurring process at step 130. In certain embodiments where the Skin Smoother is implemented using a device's GPU, the blurring process may again be separated into a horizontal blurring step (blurring based on neighboring pixels in the horizontal direction using a predetermined kernel size) and a vertical blurring step (blurring based on neighboring pixels in the vertical direction using the predetermined kernel size). In other embodiments, the blurring step 160 may optionally be skipped.

Figure 2F:

The blurred weighted average color information (e.g., FIG. 2E) provides a benchmark that may be used to determine how and where image details from the original image should be retained. In certain embodiments, e.g., at step 170, a digital filter image may be generated. The filter image may, for example, comprise color channels and an Alpha channel. In certain embodiments, the color channels may store color information determined from a smoothing of the color information of the original image. For example, smoothing the original image may be based on the edge/boundary information, which may be represented by the blurred brightness variance coefficients (e.g., FIG. 2D), and the blurred weighted average color information (e.g., FIG. 2E) of the intermediate image. The blurred brightness variance coefficients may be used to identify edges/boundaries in the original image to guide the smoothing process. For example, based on the blurred brightness variance coefficients, color details from the original image at edges/boundaries may be retained. On the other hand, regions of the original image that do not belong to an edge/boundary may be smoothed using the corresponding blurred weighted average color information. For example, smoothing a pixel at location i of the original image may be based on the equation:

$$\text{smoothed\_color}_i = \text{original\_color}_i * \text{mean}AB_i.a + \text{mean}AB_i.rgb,$$

where original_color$_i$ may represent color information (e.g., RGB values) from the original image at pixel location i; meanAB$_i$ may represent channel information (e.g., RGB and Alpha channel information) from the intermediate image at pixel location i; meanAB$_i$.a (which may alternatively be denoted meanAB$_i$.w) may represent the Alpha channel information at pixel location i (e.g., the blurred brightness variance coefficient); and meanAB$_i$.rgb may represent the color information at pixel location i (e.g., the blurred weighted average color information). Because edge/boundary information may be represented by a large brightness variance coefficient, meanAB$_i$.a may have a value close to 1. In such cases, based on the above equation, it should be appreciated that the product of original_color$_i$*meanAB$_i$.a would result in a value that is close to the original color. In other words, much of the original color may be retained at edges/boundaries. The product of original_color$_i$*meanAB$_i$.a may be added to meanAB$_i$.rgb, which may be lowly weighted in step 150 in this case and therefore would not significantly alter the original color, which may be the desired result at edges/boundaries. In contrast, a pixel in a non-edge/non-boundary region may have a small brightness variance coefficient, and consequently the small meanAB$_i$.a value (e.g., closer to 0) would decrease the contribution of the original color information (e.g., "darken" the original color information) where blurred color information is to be added. Since a non-edge/non-boundary region would likely have little brightness variance, the pixel's meanAB$_i$.rgb may have retained a more significant amount of average color information at the pixel's location (e.g., the weight applied in step 150 may be closer to 1). The blurred weighted average color information (represented by meanAB$_i$.rgb) may be added to lowly weighted original color information (represented by original_color$_i$*meanAB$_i$.a) to achieve a smoothing effect. FIG. 2F illustrates an example smoothed original image. In certain embodiments, the smoothed original image may be stored in the color channels of the filter image.

Figure 2G:
Figure 2H:
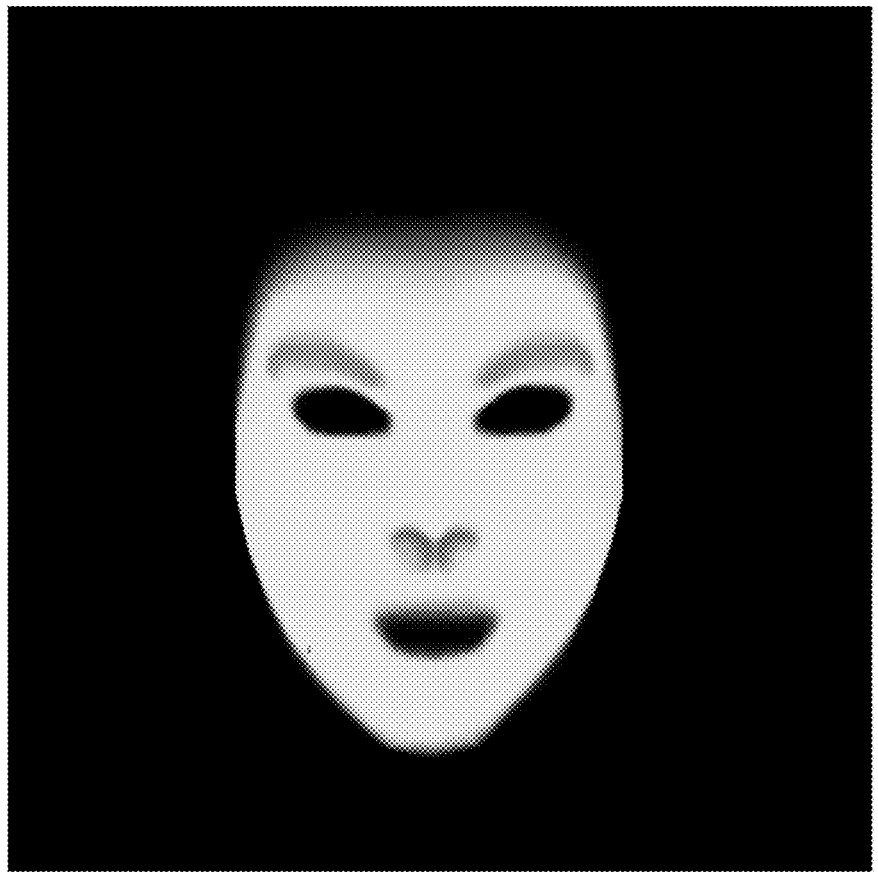

In certain embodiments, the Alpha channel of the filter image may store a mask representing opaque information and transparent information. FIG. 2H, for example, illustrates such a mask. The white regions, which represent opaque regions, substantially define a region corresponding to facial skin (e.g., excluding eyes, mouth, nostrils, eyebrows, and other facial features that should receive minimal smoothing effects). The black regions, which represent transparent regions, substantially define regions where smoothing may not be desired, such as background, hair, mouth, eyes, and other facial features. In certain embodiments, the mask may be pre-generated and selected from a collection of masks of different sizes and shapes. In certain embodiments, the mask may be dynamically generated based on, e.g., a 64-point facial track map.

In certain embodiments, high frequency color from the original image may be added to the smoothed image (e.g., FIG. 2F) to add more details in the final image, such as small skin wrinkles and other image details. For example, at step 180, high frequency color information may be determined from the original image. As an example, the high frequency color information of a particular pixel at coordinate uv may be computed by (1) calculating an average of the color information within a 3×3 kernel block centered at the coordinate uv and then subtracting the average color information by the color information of the pixel at uv. As another example, edge details from the original image may be obtained by comparing (e.g., subtracting) each pixel of the original image to the corresponding pixel in the blurred image (which in certain embodiments may be blurred with a kernel size of 3×3), e.g., FIG. 2E. In certain embodiments, if the computed high frequency color information at a pixel is not sufficiently high, no high frequency color would be used to modify the smoothed color information of the filter image (e.g., in the example code below, calculate_high_frequency( ) may return 0 if the high frequency color information is not sufficiently high). In certain embodiments, high frequency color may be weighted by a high frequency contrast value (e.g., high_frequency_contrast=0.8, as shown in the example code below). At step 190, the smoothed color information of the filter image may be, e.g., modified using the high frequency color information (which may be weighted). For example, the weighted high frequency color may be added to the smoothed color information. FIG. 2G illustrates an example of the smoothed original image with added high frequency color details.

In certain embodiments, an example programming code (in the OpenGL syntax) for generating the filter image (e.g., Pass 3) is provided below:

```
uniform sampler2D Original; //Original image.
uniform sampler2D MeanAB; //Intermediate image after,
e.g., step 160.
  uniform sampler2D Mask; //Transparent/opaque mask.
  varying medium vec2 uv; //Coordinates of a pixel.
  varying medium vec2 vMask; //Coordinates of a pixel
  const float high_frequency_contrast=0.8; //Weight for
high frequency color
  void main( ){
    lowp vec4 meanAB=texture2D(MeanAB, uv);
    lowp vec4 mask=texture2D(Mask, vMask);
    lowp vec3 high_frequency=calculate_high_frequency
        (Original, uv);
    lowp vec3 smoothed=texture2D(Original,
        uv).rgb*meanAB.a+meanAB.rgb;
    gl_FragColor.rgb=smoothed+
        high_frequency_contrast*high_frequency;
    gl_FragColor.a=mask;
  }
```

Figure 2I:
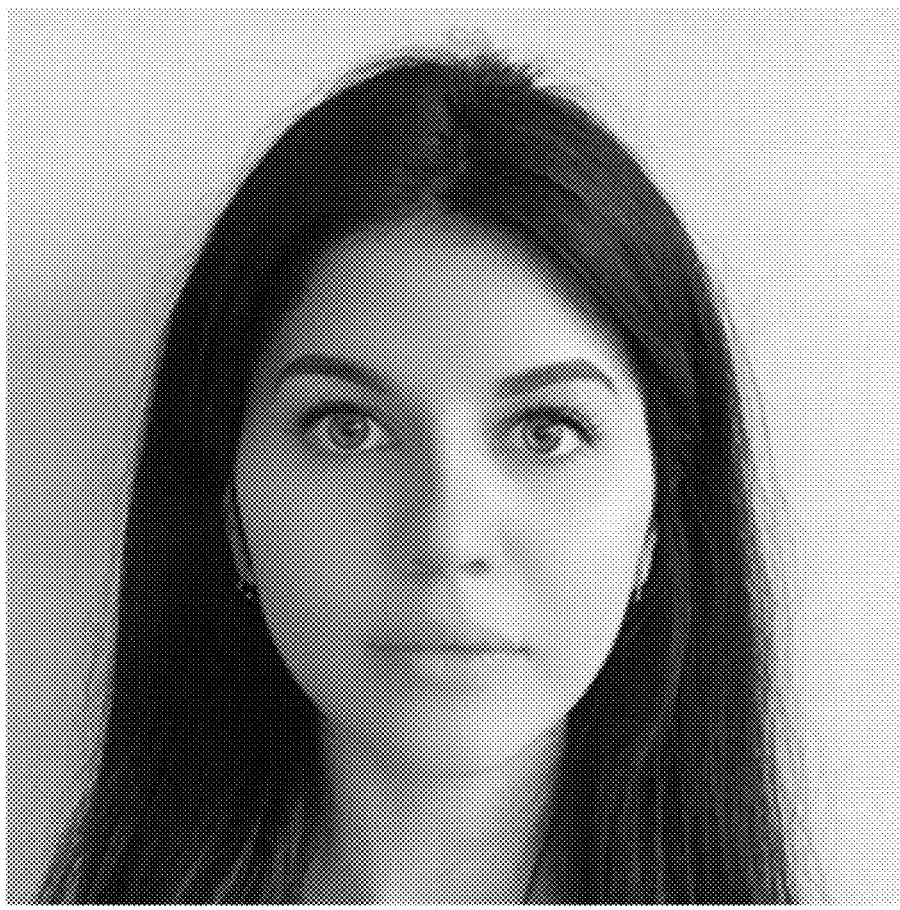

In certain embodiments, after step 190 the filter image may contain a smoothed image with high frequency details (e.g., FIG. 2G) and an opacity/transparency mask (e.g., FIG. 2H). This filter image may be applied to the original image (e.g., FIG. 2A) to generate a final output image (e.g., FIG. 2I). For example, at step 195 a display may be output based on an overlay of the filter image over the original image. To illustrate, the mask in the filter image may indicate that facial skin in the filter image is to be opaque and everything else (e.g., background, hair, eyes, mouth, and other facial features where smoothness is not desired) is to be transparent. By overlaying the filter image over the original image, the smoothed facial skin from the filter image corresponding to the opaque regions defined by the mask may replace or cover the corresponding pixels in the original image, thus providing a smoothed skin effect in the final output image (see FIG. 2I). Because the mask indicates that regions where smoothness is undesired are to be transparent, the corresponding regions in the original image would be shown in the final output image. For example, it should be appreciated that the final output image shown in FIG. 2I shows smoother facial skin as compared to the original image shown in FIG. 2A, but retains details (e.g., not being smoothed or being smoothed to a lesser degree) in, e.g., the background and the woman's hair, eyes, lips, facial edges, etc.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for smoothing skin appearance including the particular steps of the method of FIG. 1, this disclosure contemplates any suitable method for smoothing skin appearance including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 3:
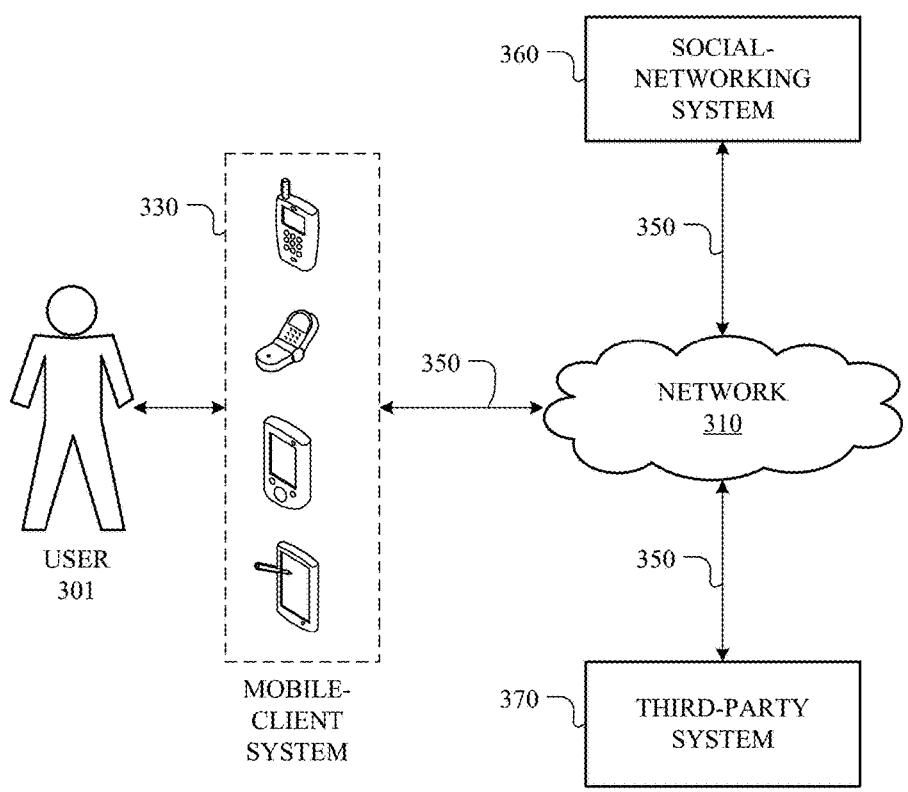
FIG. 3 illustrates an example system network.

FIG. 3 illustrates an example network environment 300 associated with a social-networking system. Network environment 300 includes a user 301, a client system 330, a social-networking system 360, and a third-party system 370 connected to each other by a network 310. Although FIG. 3 illustrates a particular arrangement of user 301, client system 330, social-networking system 360, third-party system 370, and network 310, this disclosure contemplates any suitable arrangement of user 301, client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of users 301, client systems 330, social-networking systems 360, third-party systems 370, and networks 310. As an example and not by way of limitation, network environment 300 may include multiple users 301, client system 330, social-networking systems 360, third-party systems 370, and networks 310.

In particular embodiments, user 301 may be an individual (human user), an entity (e.g., an enterprise, business, or third-party application), or a group (e.g., of individuals or entities) that interacts or communicates with or over social-networking system 360. In particular embodiments, social-networking system 360 may be a network-addressable computing system hosting an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include an authorization server (or other suitable component(s)) that allows users 301 to opt in to or opt out of having their actions logged by social-networking system 360 or shared with other systems (e.g., third-party systems 370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 370 may be a network-addressable computing system that can host the skin-smoothing method described herein. Third-party system 370 may generate, store, receive, and send the smoothed image/video back to the user 301 or to other users connected to the user 301 (e.g., through the social networking system 360). Third-party system 370 may be accessed by the other components of network environment 300 either directly or via network 310. In particular embodiments, one or more users 301 may use one or more client systems 330 to access, send data to, and receive data from social-networking system 360 or third-party system 370. Client system 330 may access social-networking system 360 or third-party system 370 directly, via network 310, or via a third-party system. As an example and not by way of limitation, client system 330 may access third-party system 370 via social-networking system 360. Client system 330 may be any suitable computing device, such as, for example, a personal computer, a laptop computer, a cellular telephone, a smartphone, a tablet computer, or an augmented/virtual reality device. In particular embodiments, the skin-smoothing process 100 described herein may be implemented on the user mobile client system 330. In particular embodiments, the skin-smoothing process 100 may be implemented on the social networking system 360. In particular embodiments, the skin smoothing process 100 may be distributed between any combination of the mobile client system 330, social networking system 360, and/or third-party system 370.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

Figure 4:
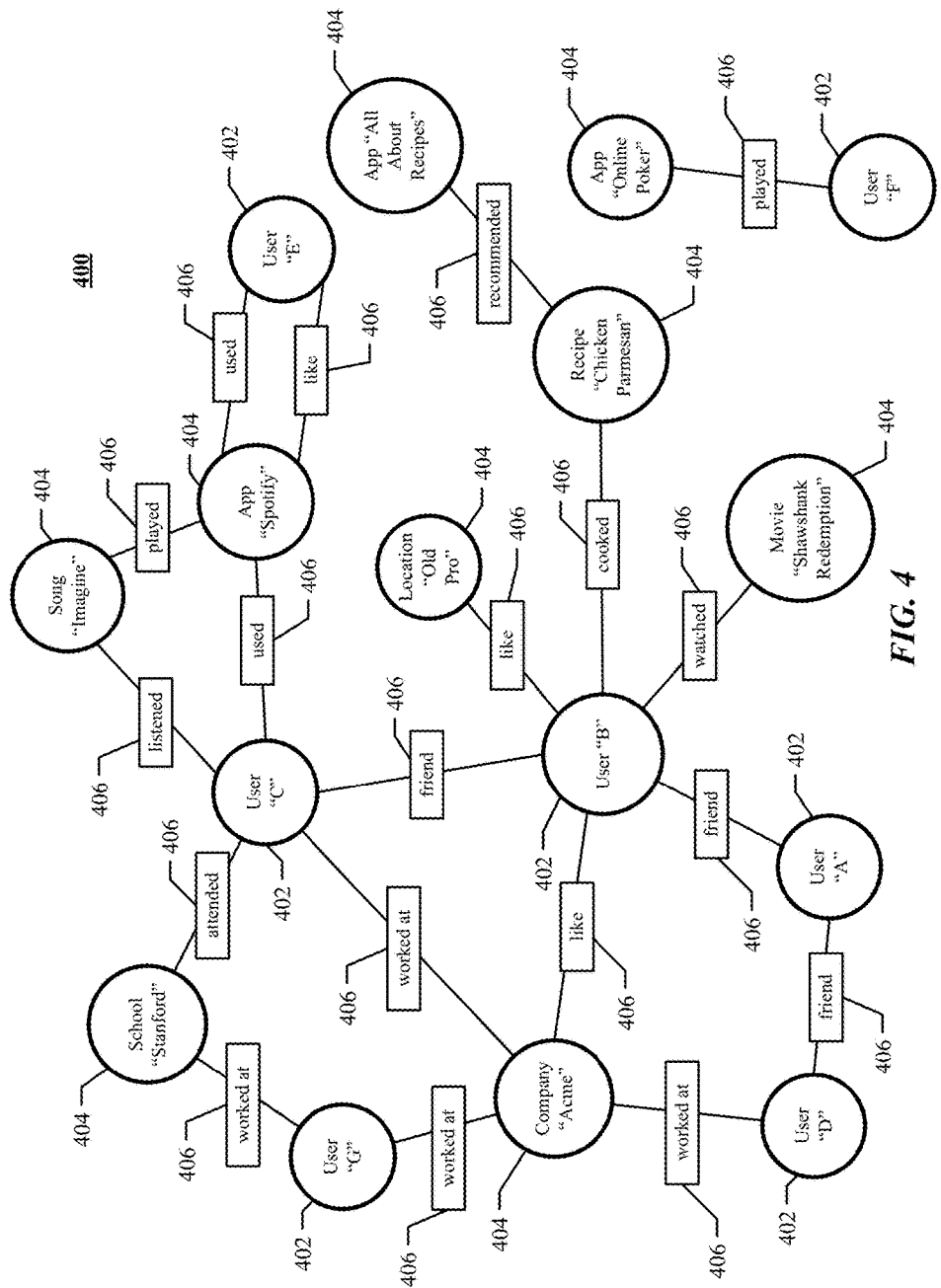
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 130, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite"

edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 130) may indicate that he or she likes the concept represented by the concept node 404 by clicking or selecting a "Like" icon, which may cause the user's client system 130 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
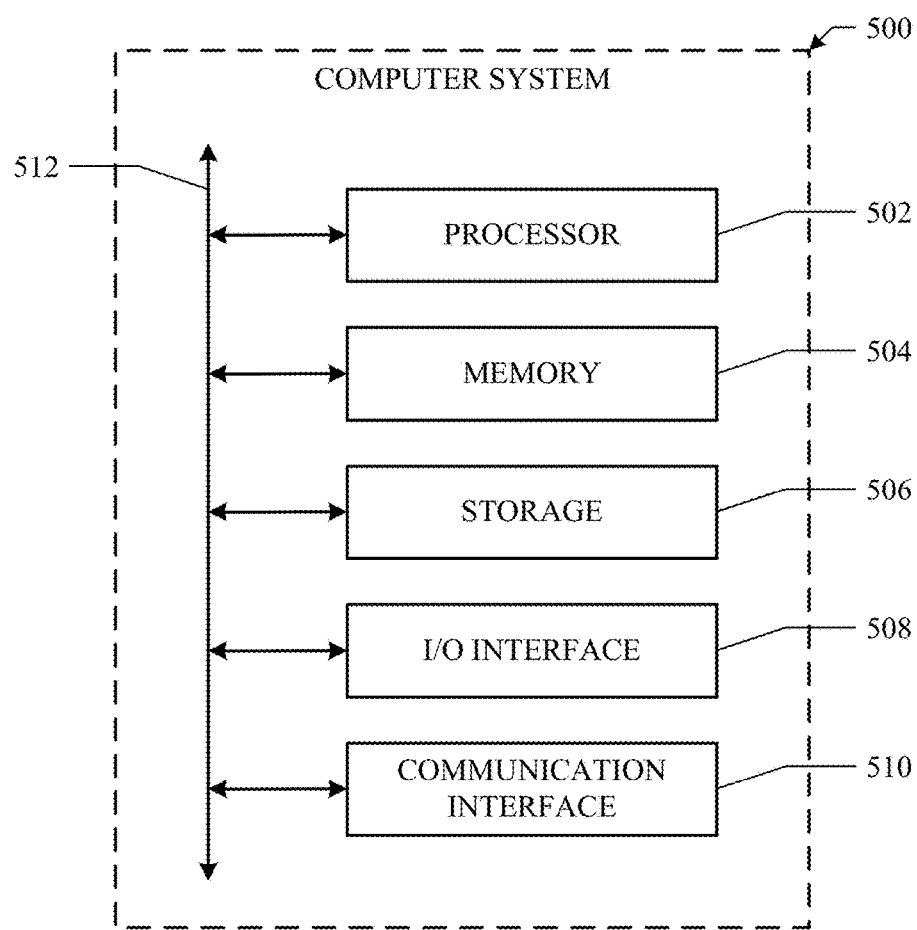
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   accessing, using a processing system, a first digital image of an object, the first digital image comprising color information;
   generating, using the processing system, blurred color information and blurred brightness information based on the color information of the first digital image;
   detecting, using the processing system, edge information associated with the object based on the blurred brightness information, the edge information identifying one or more regions in the first digital image that correspond to one or more edges of the object in the first digital image;
   modifying, using the processing system, the blurred color information based on the edge information associated with the object;
   determining, using the processing system, edge color information based on the modified blurred color information and the first digital image;
   generating, using the processing system, smoothed color information based on the color information of the first digital image;
   modifying, using the processing system, the smoothed color information based on the edge color information; and
   outputting, using the processing system, a second digital image that comprises a portion of the color information of the first digital image and a portion of the modified smoothed color information.

2. The method of claim 1, wherein the blurred color information is stored in color channels of a third digital image and the blurred brightness information is stored in an Alpha channel of the third digital image.

3. The method of claim 1, wherein the detecting of the edge information is further based on the blurred color information.

4. The method of claim 1, wherein the modifying of the blurred color information comprises applying weights to the blurred color information, wherein the weights are determined based on the edge information.

5. The method of claim 1, wherein the edge color information comprises high frequency color information from the first digital image.

6. The method of claim 1, wherein a mask representing opaque information and transparent information defines the portion of the color information of the first digital image and the portion of the modified smoothed color information that are included in the second digital image.

7. The method of claim 6, wherein the mask is stored in an Alpha channel of a third digital image and the modified smoothed color information is stored in color channels of the third digital image, wherein the second digital image is generated by overlaying the third digital image over the first digital image.

8. One or more computer-readable non-transitory storage media embodying software that is operable when executed to:
   access a first digital image of an object, the first digital image comprising color information;
   generate blurred color information and blurred brightness information based on the color information of the first digital image;
   detect edge information associated with the object based on the blurred brightness information, the edge information identifying one or more regions in the first digital image that correspond to one or more edges of the object in the first digital image;
   modify the blurred color information based on the edge information associated with the object;
   determine edge color information based on the modified blurred color information and the first digital image;

generate smoothed color information based on the color information of the first digital image;

modify the smoothed color information based on the edge color information; and output a second digital image that comprises a portion of the color information of the first digital image and a portion of the modified smoothed color information.

9. The media of claim 8, wherein the blurred color information is stored in color channels of a third digital image and the blurred brightness information is stored in an Alpha channel of the third digital image.

10. The media of claim 8, wherein the detection of the edge information is further based on the blurred color information.

11. The media of claim 8, wherein the modification of the blurred color information comprises applying weights to the blurred color information, wherein the weights are determined based on the edge information.

12. The media of claim 8, wherein the edge color information comprises high frequency color information from the first digital image.

13. The media of claim 8, wherein a mask representing opaque information and transparent information defines the portion of the color information of the first digital image and the portion of the modified smoothed color information that are included in the second digital image.

14. The media of claim 13, wherein the mask is stored in an Alpha channel of a third digital image and the modified smoothed color information is stored in color channels of the third digital image, wherein the second digital image is generated by overlaying the third digital image over the first digital image.

15. A system comprising: one or more processors; and one or more computer-readable non-transitory storage media coupled to one or more of the processors and comprising instructions operable when executed by one or more of the processors to cause the system to:

access a first digital image of an object, the first digital image comprising color information;

generate blurred color information and blurred brightness information based on the color information of the first digital image;

detect edge information associated with the object based on the blurred brightness information, the edge information identifying one or more regions in the first digital image that correspond to one or more edges of the object in the first digital image;

modify the blurred color information based on the edge information associated with the object;

determine edge color information based on the modified blurred color information and the first digital image;

generate smoothed color information based on the color information of the first digital image;

modify the smoothed color information based on the edge color information; and output a second digital image that comprises a portion of the color information of the first digital image and a portion of the modified smoothed color information.

16. The system of claim 15, wherein the blurred color information is stored in color channels of a third digital image and the blurred brightness information is stored in an Alpha channel of the third digital image.

17. The system of claim 15, wherein the detection of the edge information is further based on the blurred color information.

18. The system of claim 15, wherein the modification of the blurred color information comprises applying weights to the blurred color information, wherein the weights are determined based on the edge information.

19. The system of claim 15, wherein the edge color information comprises high frequency color information from the first digital image.

20. The system of claim 15, wherein a mask representing opaque information and transparent information defines the portion of the color information of the first digital image and the portion of the modified smoothed color information that are included in the second digital image;

wherein the mask is stored in an Alpha channel of a third digital image and the modified smoothed color information is stored in color channels of the third digital image; and wherein the second digital image is generated by overlaying the third digital image over the first digital image.

* * * * *